US 12,260,737 B1

(12) United States Patent
Bunker et al.

(10) Patent No.: US 12,260,737 B1
(45) Date of Patent: Mar. 25, 2025

(54) DEVICE CONFIGURED TO CLASSIFY EVENTS AND IDENTIFY OCCUPANTS

(71) Applicant: Vivint, Inc., Provo, UT (US)

(72) Inventors: Brandon Bunker, Highland, UT (US); Rongbin Lanny Lin, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 17/038,230

(22) Filed: Sep. 30, 2020

(51) Int. Cl.
G08B 25/01 (2006.01)
G06N 20/00 (2019.01)
G16Y 40/10 (2020.01)
G16Y 40/50 (2020.01)

(52) U.S. Cl.
CPC ........... G08B 25/016 (2013.01); G06N 20/00 (2019.01); G16Y 40/10 (2020.01); G16Y 40/50 (2020.01)

(58) Field of Classification Search
CPC ...... G08B 25/016; G06N 20/00; G16Y 40/10; G16Y 40/50
See application file for complete search history.

(56) References Cited

U.S. PATENT DOCUMENTS

| | | | |
|---|---|---|---|
| 6,225,906 B1 * | 5/2001 | Shore | G08B 25/14 340/10.5 |
| 6,654,732 B1 | 11/2003 | Naito et al. | |
| 6,748,343 B2 | 6/2004 | Alexander et al. | |
| 7,193,644 B2 | 3/2007 | Carter | |
| 7,956,739 B2 | 6/2011 | Hong et al. | |
| 8,139,095 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 9,414,030 B2 | 8/2016 | Carter | |
| 9,432,638 B2 | 8/2016 | Carter | |
| 9,485,478 B2 | 11/2016 | Carter | |
| 9,501,613 B1 * | 11/2016 | Hanson | G16H 40/67 |
| 9,516,284 B2 | 12/2016 | Carter | |
| 9,648,290 B2 | 5/2017 | Carter | |
| 9,653,323 B2 | 5/2017 | Chew | |
| 9,654,485 B1 * | 5/2017 | Neumann | H04L 63/1416 |
| 10,452,913 B1 * | 10/2019 | Cervelli | G06V 20/176 |
| 10,559,307 B1 * | 2/2020 | Khaleghi | G10L 15/26 |
| 10,674,120 B2 | 6/2020 | Carter | |

(Continued)

FOREIGN PATENT DOCUMENTS

CN 104965503 A 10/2015

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).

(Continued)

Primary Examiner — Rufus C Point
(74) Attorney, Agent, or Firm — Nolte Lackenbach Siegel

(57) ABSTRACT

Methods, systems, and devices for smart sensing using a security and automation system are described. One method may include receiving, from a sensor, sensor data associated with an event and one or more occupants at a structure, determining a characteristic of the event based on the received sensor data, determining a type of the event based on the characteristic, and identifying an identity of an occupant based at least in part on the characteristic and the type of the event.

20 Claims, 11 Drawing Sheets

(56) References Cited

U.S. PATENT DOCUMENTS

| | | |
|---|---|---|
| 10,986,717 B1 | 4/2021 | Fu et al. |
| 11,195,398 B1 | 12/2021 | Fu et al. |
| 11,581,099 B1 * | 2/2023 | Rufo ................. G16H 20/13 |
| 2002/0070859 A1 * | 6/2002 | Gutta ............. G08B 13/19652 |
| | | 340/541 |
| 2002/0086660 A1 | 7/2002 | Sullivan et al. |
| 2003/0117280 A1 | 6/2003 | Prehn |
| 2003/0118216 A1 * | 6/2003 | Goldberg ............ H04N 1/0019 |
| | | 707/E17.026 |
| 2005/0176400 A1 | 8/2005 | Mullet et al. |
| 2005/0281435 A1 | 12/2005 | Aggarwal |
| 2006/0041500 A1 | 2/2006 | Diana et al. |
| 2006/0053342 A1 * | 3/2006 | Bazakos .......... G08B 13/19682 |
| | | 714/37 |
| 2009/0048859 A1 | 2/2009 | McCarthy et al. |
| 2009/0299825 A1 | 12/2009 | Olawski et al. |
| 2009/0299854 A1 | 12/2009 | Olawski et al. |
| 2010/0082174 A1 | 4/2010 | Weaver et al. |
| 2010/0289643 A1 | 11/2010 | Trundle et al. |
| 2011/0054973 A1 | 3/2011 | Deich et al. |
| 2012/0023145 A1 | 1/2012 | Brannon et al. |
| 2012/0284777 A1 | 11/2012 | Eugenio et al. |
| 2012/0316690 A1 | 12/2012 | Li et al. |
| 2014/0015981 A1 | 1/2014 | Dietl |
| 2014/0266681 A1 | 9/2014 | Small |
| 2014/0278028 A1 | 9/2014 | Nye et al. |
| 2014/0282048 A1 | 9/2014 | Shapiro et al. |
| 2014/0324192 A1 | 10/2014 | Baskaran et al. |
| 2015/0039105 A1 | 2/2015 | Lee et al. |
| 2015/0088329 A1 | 3/2015 | Thiruvengada et al. |
| 2015/0108901 A1 | 4/2015 | Greene et al. |
| 2015/0178346 A1 * | 6/2015 | Bailey ................. G06F 16/215 |
| | | 707/691 |
| 2015/0228419 A1 | 8/2015 | Fadell et al. |
| 2016/0026354 A1 | 1/2016 | Mcintosh et al. |
| 2016/0142407 A1 | 5/2016 | Chun et al. |
| 2016/0261425 A1 | 9/2016 | Horton et al. |
| 2016/0274230 A1 | 9/2016 | Wu et al. |
| 2016/0314255 A1 | 10/2016 | Cook et al. |
| 2016/0350654 A1 * | 12/2016 | Lee ................... H04L 12/2827 |
| 2016/0357163 A1 | 12/2016 | Marti et al. |
| 2017/0039480 A1 * | 2/2017 | Bitran ................... A61B 5/01 |
| 2017/0099200 A1 * | 4/2017 | Ellenbogen ............ G06N 5/022 |
| 2017/0262706 A1 | 9/2017 | Sun et al. |
| 2017/0351961 A1 * | 12/2017 | Kochura ................ G06Q 50/01 |
| 2017/0365149 A1 | 12/2017 | Ten Kate |
| 2018/0035901 A1 | 2/2018 | Cronin et al. |
| 2018/0047274 A1 | 2/2018 | Miwa |
| 2018/0114420 A1 | 4/2018 | Siminoff et al. |
| 2018/0165933 A1 | 6/2018 | Siminoff |
| 2018/0189913 A1 * | 7/2018 | Knopp ................... H04W 4/021 |
| 2018/0233140 A1 * | 8/2018 | Koishida ................ H04N 5/332 |
| 2018/0240454 A1 * | 8/2018 | Raj ........................ G10L 13/00 |
| 2018/0294047 A1 | 10/2018 | Hosseini et al. |
| 2018/0341835 A1 | 11/2018 | Siminoff |
| 2019/0065833 A1 * | 2/2019 | Wang ................... G06V 40/172 |
| 2019/0087646 A1 | 3/2019 | Goulden et al. |
| 2019/0108404 A1 | 4/2019 | Xu |
| 2019/0156601 A1 * | 5/2019 | Sinha .................... G05B 15/02 |
| 2019/0327448 A1 | 10/2019 | Fu et al. |
| 2020/0180506 A1 | 6/2020 | Nakayama et al. |
| 2021/0056184 A1 | 2/2021 | Modani et al. |
| 2022/0165036 A1 | 5/2022 | Daley et al. |

OTHER PUBLICATIONS

Unboxing the Ring Video Dorrbell is it Worth it video.

* cited by examiner

| Occupant Identity | Activity | Unique Characteristics |
|---|---|---|
| Mary Smith | Cooking | Only cooks between 7 am and 10 am; makes breads, eggs, and sweets; never leaves the kitchen when the oven is on, cleans up ingredients as she cooks; |
| John Smith | Cooking | Only cooks in the afternoon or evening; grills meats; usually leaves the kitchen while the grill is preheating; cleans all the ingredients up at once after eating the cooked meat |

FIG. 4

DEVICE CONFIGURED TO CLASSIFY EVENTS AND IDENTIFY OCCUPANTS

BACKGROUND

The present disclosure, for example, relates to security and automation systems, and more particularly to privacy management of locally collected and locally stored data in security and automation systems.

Security and automation systems are widely deployed in a smart environment (e.g., a residential, a commercial, or an industrial setting) to provide various types of communication and functional features such as monitoring, communication, notification, and/or others. These systems may be capable of supporting communication with a person through a communication connection or a system management action. In some examples, security and automation systems can include multiple devices that gather information about what occurs within the smart environment and respond accordingly.

SUMMARY

The described techniques relate to improved methods, systems, or apparatuses that support smart sensing using a security and automation system.

A method for smart sensing using a security or home automation system is described. The method may include receiving, from a sensor, sensor data associated with an event and one or more occupants at a structure, determining a characteristic of the event based at least in part on the received sensor data, determining a type of the event based at least in part on the characteristic, and identifying an identity of an occupant based at least in part on the characteristic and the type of the event.

An apparatus for smart sensing using a security or home automation system is described. The apparatus may include means for receiving, from a sensor, sensor data associated with an event and one or more occupants at a structure, means for determining a characteristic of the event based at least in part on the received sensor data, means for determining a type of the event based at least in part on the characteristic, and means for identifying an identity of an occupant based at least in part on the characteristic and the type of the event.

Another apparatus for smart sensing using a security or home automation system is described. The apparatus may include a processor, memory in electronic communication with the processor, and instructions stored in the memory. The instructions may be operable to cause the processor to receive, from a sensor, sensor data associated with an event and one or more occupants at a structure, determine a characteristic of the event based at least in part on the received sensor data, determine a type of the event based at least in part on the characteristic, and identify an identity of an occupant based at least in part on the characteristic and the type of the event.

A non-transitory computer-readable medium for smart sensing using a security or home automation system is described. The non-transitory computer-readable medium may include instructions operable to cause a processor to receive, from a sensor, sensor data associated with an event and one or more occupants at a structure, determine a characteristic of the event based at least in part on the received sensor data, determine a type of the event based at least in part on the characteristic, and identify an identity of an occupant based at least in part on the characteristic and the type of the event.

Some examples of the method, apparatus, and non-transitory computer-readable medium described above may further include processes, features, means, or instructions for receiving sensor data related to the event from a second sensor different from the first sensor, and determining a second characteristic of the event based at least in part on the received sensor data from the second sensor. In some examples of the method, apparatus, and non-transitory computer-readable medium described above, identifying the identity of the occupant is further based at least in part on the characteristic, the second characteristic, and the type of the event.

Some examples of the method, apparatus, and non-transitory computer-readable medium described above may further include processes, features, means, or instructions for constructing a database from the received data comprising an event type, associating the first characteristic with the event type, associating the second characteristic with the event type, and defining an occupant-specific event based at least on part on associating the first characteristic and the second characteristic.

Some examples of the method, apparatus, and non-transitory computer-readable medium described above may further include processes, features, means, or instructions for comparing a real-time event performed by the occupant to the first characteristic or the second characteristic, or both in the constructed database, and determining a match between the real-time event and the occupant-specific event based at least in part on the comparing. In some examples of the method, apparatus, and non-transitory computer-readable medium described above, identifying the identity of the occupant is further based at least in part on the determined match.

Some examples of the method, apparatus, and non-transitory computer-readable medium described above may further include processes, features, means, or instructions for detecting the occupant performing a real-time event, comparing a real-time event performed by the occupant to the first characteristic or the second characteristic, or both in the constructed database, and determining that the real-time event is different from the occupant-specific event based at least in part on the comparing. In some examples of the method, apparatus, and non-transitory computer-readable medium described above, identifying the identity the occupant is further based at least in part on the first characteristic or the second characteristic, or both.

Some examples of the method, apparatus, and non-transitory computer-readable medium described above may further include processes, features, means, or instructions for generating a message indicating that the real-time event performed by the occupant is different from the occupant-specific event, and transmitting the message to another occupant associated with the structure or personnel located remote from the structure.

Some examples of the method, apparatus, and non-transitory computer-readable medium described above may further include processes, features, means, or instructions for determining a level of influence on other occupant-specific events of other occupants associated with the structure based at least in part on occupant-specific events of the occupant, and performing a machine learning model on the other occupant-specific events to dynamically manage a characteristic profile of the other occupants based at least in part on the determined level of influence.

Some examples of the method, apparatus, and non-transitory computer-readable medium described above may further include processes, features, means, or instructions for generating a message requesting the occupant to confirm the event, transmitting the message to a device of the occupant, receiving a response from the device of the occupant, and determining that the event is confirmed based at least in part on the received response.

Some examples of the method, apparatus, and non-transitory computer-readable medium described above may further include processes, features, means, or instructions for generating a message requesting the occupant to confirm the identity, transmitting the message to a device of the occupant, receiving a response from the device of the occupant, and determining that the identity is confirmed based at least in part on the received response.

Some examples of the method, apparatus, and non-transitory computer-readable medium described above may further include processes, features, means, or instructions for comparing the characteristic of the event to at least one characteristic profile associated with the security or home automation system, determining whether the characteristic of the event matches at least one characteristic in the at least one characteristic profile, and determining that the characteristic of the event is unmatchable to at least one characteristic in the at least one characteristic profile based at least in part on the comparing.

Some examples of the method, apparatus, and non-transitory computer-readable medium described above may further include processes, features, means, or instructions for determining that the identity of the occupant is unknown based at least in part on the characteristic of the event being unmatchable to at least one characteristic in the at least one characteristic profile, generating a message indicating that the identity of the occupant is unknown, and transmitting the message to a device associated with another occupant that is different from the occupant.

Some examples of the method, apparatus, and non-transitory computer-readable medium described above may further include processes, features, means, or instructions for performing machine learning classification via the security or home automation system to associate sensor data associated with an event and the one or more occupants. In some examples of the method, apparatus, and non-transitory computer-readable medium described above, identifying the identity of the occupant is further based at least in part on the machine learning classification.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

FIG. 4 illustrates an example diagram of information for identifying an occupant in accordance with aspects of the present disclosure.

DETAILED DESCRIPTION

Figure 1:
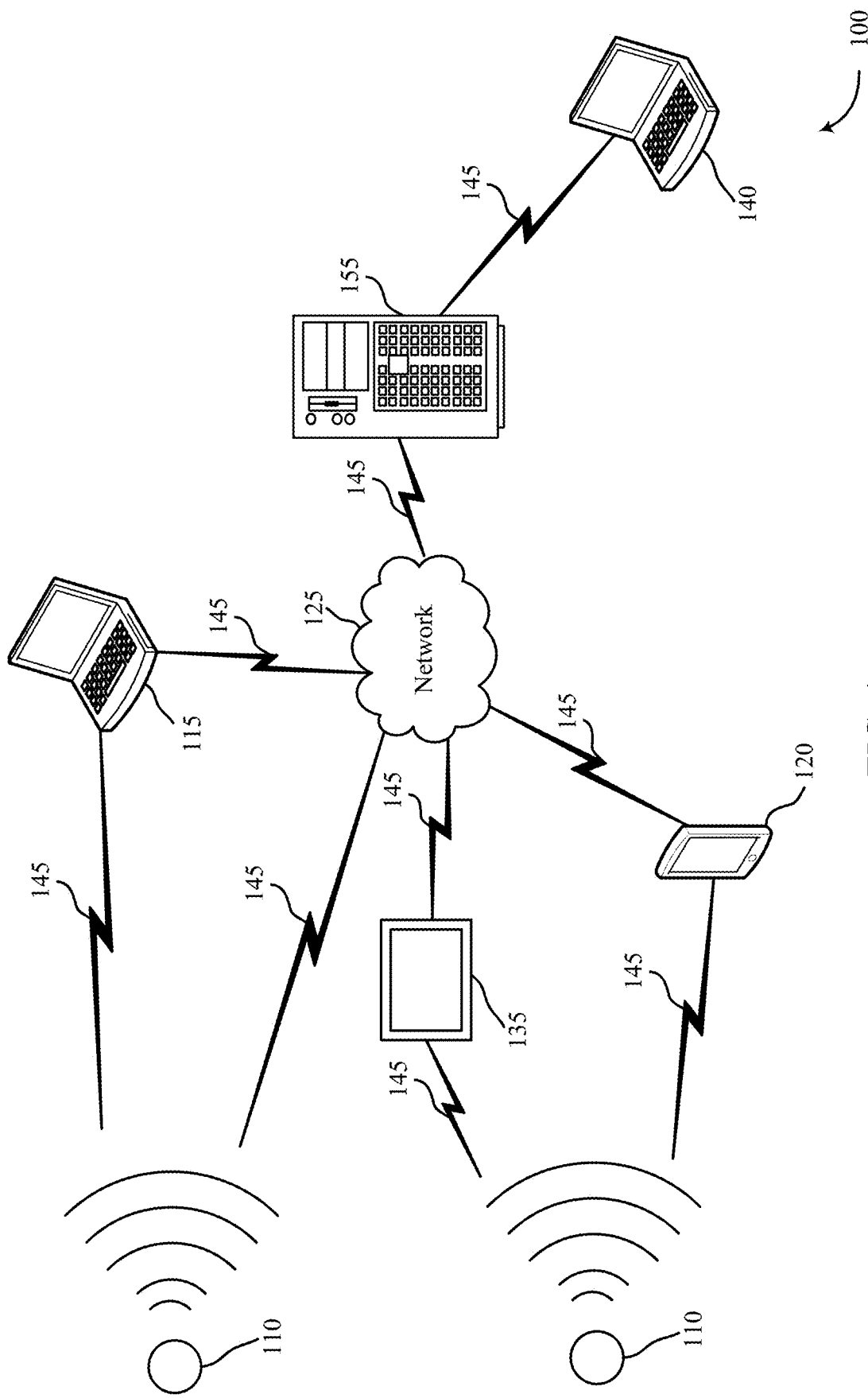
FIG. 1 illustrates an example of a system for smart sensing using a security and automation system that supports smart sensing in accordance with aspects of the present disclosure.

The described techniques relate to improved methods, systems, or apparatuses that support smart sensing using a security and automation system. A smart home environment may have a control panel that an occupant may use to apply settings, preferences, and reminders, which the system may use in combination with additional data received from a sensing device (e.g., a sensor), to monitor occupants within the smart environment, collect data of the occupants, identify the characteristic of specific occupants in performing at least one activity, and storing the unique characteristics of the occupant in such a way that the identity of the occupant can be identified later based at least in part on the way that the occupant carries out an activity. In some cases, the identity of the occupant may be determined based on how the occupant performs the activity. In other cases, how the occupant performs the activity may be just one of multiple factors used to identify the identity of the occupant.

The control panel may be in communication with at least one sensing device to monitor an occupant associated with a smart environment. In some cases, the sensing device may be a standalone sensor or may be embedded, installed, positioned, or integrated with a component associated with the security and automation system. The sensing device may record, track, and provide information to the control panel relating to a status of the occupant or a component of the smart environment. The sensors may be used to determine characteristics about the occupants, such as the how long it takes the occupant to perform an activity, the products the occupant uses to perform the activity, the brand of products used by the occupant, patterns of how the occupant performs the activities, the routes used by the occupant when performing the activity, where the occupant performs the activity, sounds produced by the occupant when performing the activity, other types of characteristics about how the occupant performs the activity, or combinations thereof.

In some cases, before the security and automation system can establish the identity of the occupant performing the activities by how the occupant performs the activity alone, the security and automation system may use facial recognition, ask the occupant about his or her identity over a speaker or through an electronic device, identify the occupant through another mechanism, or combinations thereof. The collected data may be stored locally within or remote from the smart environment. The collected data may be analyzed to determine which characteristics of the occupant are unique to the occupant and which characteristics are common with other occupants within the smart environment. The security and automation system may use those characteristics that are unique to the occupant for identifying the identity of the occupant. The other characteristics that are common with other occupants may be used to determine the type of activity that is being performed. In some cases, the occupant specific characteristics may also be used to identify the type of activity.

In some cases, even after the occupant is identified, the security and automation system may continue to analyze how the occupant performs the activity. In some cases, the continual monitoring may be used to adjust or refine the characteristics associated with the occupant. In some cases, the range of how long it takes for a specific occupant to perform a task may narrow or widen as the system analyzes additional samples. In some cases, the security and automation system may refine the routes, products, brands, sounds, energy, locations, and so forth associated with the occupant specific characteristics. In some cases, the characteristics associated with the occupant may be reclassified as occupant specific or as common to multiple occupants. In other cases, the security and automation system may determine the occupant is in an unsafe situation or may desire assistance based on the occupant failing to carry out an activity that fits the unique characteristics associated with the occupant. In this situation, the security and automation system may send the occupant or another person a message alerting them to the situation.

The security and automation system may support distinguishing between different occupants who have different needs and/or preferences. The security and automation system may customize how it responds to different occupants. In some cases, the identity of the occupant is determined before determining if the occupant needs assistance or how to assist. Conventional systems monitoring environments with multiple occupants may offer unnecessary assistance to an occupant if the system considers the needs of each occupant to be same or similar. The security and automation system described herein may support refining its interaction with different occupants based at least in part on smart sensing.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates an example of a system 100 for smart sensing using a security and automation system that supports managing privacy of data in accordance with aspects of the present disclosure. In some cases, the system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate cases, the network 125 may be integrated with any one of the local computing device 115, 120, server 155, or remote computing device 140, such that separate components are not required.

Local computing device 115, 120 and remote computing device 140 may be custom computing entities configured to interact with sensor units 110 via network 125, and in some cases, via server 155. In other cases, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®), an iPad®, a smartphone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The control panel 135 and the local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some cases, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some cases, the output may be an integral component of the local computing devices 115, 120. Similarly stated, the output may be directly coupled to the processor. For example, the output may be the integral display of a tablet and/or smart phone. In some cases, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some cases, the one or more sensor units 110 may be sensors configured to conduct periodic or ongoing automatic measurements related to smart sensing. Each sensor unit 110 may be capable of sensing multiple parameters, or alternatively, separate sensor units 110 may monitor separate parameters. For example, one sensor unit 110 may monitor for audio, while another sensor unit 110 (or, in some cases, the same sensor unit 110) may capture video. In some cases, one or more sensor units 110 may additionally monitor alternate sensor parameters, such as conversations, Internet access, website browsing, etc.

Data gathered by the one or more sensor units 110 may be communicated to local computing device 115, 120, which may be, in some cases, a wall-mounted input/output smart home display. In other cases, local computing device 115, 120 may be a personal computer or smart phone. Where local computing device 115, 120 may be a smart phone, the smart phone may have a dedicated application directed to collecting sensor data and calculating predictions therefrom. The local computing device 115, 120 may process the data received from the one or more sensor units 110 to obtain prediction of smart sensing. In alternate cases, remote computing device 140 may process the data received from the one or more sensor units 110, via network 125 and server 155, to obtain prediction of smart sensing. Data transmission may occur via, for example, frequencies appropriate for a personal area network (such as BLUETOOTH® or IR communications) or local or wide area network frequencies such as radio frequencies specified by the IEEE 802.15.4 standard.

In some cases, local computing device 115, 120 may communicate with remote computing device 140 or control panel 135 via network 125 and server 155. Examples of network 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some cases, a user may access the functions of local computing device 115, 120 from remote computing device 140. For example, in some cases, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135. The server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of sensor data from a sensor unit 110, a stream of sensor data from the same or a different sensor unit 110, and a stream of sensor data from either the same or yet another sensor unit 110. In some cases, server 155 may "pull" the data streams, e.g., by querying the sensor units 110, the local computing devices 115, 120, and/or the control panel 135. In some cases, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory) containing sensor data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with user data (e.g., captured images of the occupant(s), recorded video of the occupant(s), Internet browsing of the occupant(s), etc.).

The control panel 135 may monitor at least one occupant of the smart environment. The control panel 135 may determine the likes, dislikes, interests, hobbies, products, product brands used by the occupant(s), or combinations thereof. Cameras, microphones, and other types of sensors may be used to gather the information about the occupant. In some cases, the control panel 135 in conjunction with the server 155 or the local computing devices 115, 120 may identify a service or a product, or both used by an occupant in the smart environment. The control panel 135 may construct a local database based at least in part on the collected data (e.g., identify a service or a product, or both used by an occupant, determine the likes, dislikes, interests, hobbies, products, product brands used by the occupant(s), or combinations thereof, etc.), and manage automatically and/or semi-autonomously privacy of data related to the occupant(s).

In some cases, the control panel 135 in conjunction with the server 155 or the local computing devices 115, 120 may allow an occupant of a residence, building, or another type of premise to control what types of information are allowed to be accessible by third-parties. The information can be gathered by the control panel 135 in conjunction with the server 155 or the local computing devices 115, 120. These types of devices may include microphones that can record conversations, images of possessions owned or products the frequent the premise, or other types of sensors that record the type of activities that a user enjoys doing. For example, the control panel 135 in conjunction with the server 155 or the local computing devices 115, 120 may determine that an occupant enjoys baking. The control panel 135 in conjunction with the server 155 or the local computing devices 115, 120 may also discern the occupant's gender, general age, similar interests, ethnicity, and other demographic information about the occupant. The control panel 135 in conjunction with the server 155 or the local computing devices 115, 120 may also record conversations between occupants about where the occupants desire to travel, career aspirations, desired type of entertainment, and so forth. The control panel 135 in conjunction with the server 155 or the local computing devices 115, 120 may also determine with cameras what the user is browsing on the internet, and so forth.

In some cases, rather than sending this information to the cloud for storage, this data may be stored locally where the user has control of who has access to the data. Thus, rather than the company providing a home automation system having the ability to sell the data to third-parties for commercialization purposes, the occupant can give permission to the third-parties to access the data, give permission to just a subset of the data, or deny access all together. In some cases, the third-party may have to provide a benefit to the occupant in exchange for access. For example, the third-party may have to pay for access. The occupant may also have an ability to set parameters for the data. For example, the user may set the parameters so that general information, like hobbies enjoyed by the occupant are accessible, but identification of occupants is not accessible. Also, personal information that is obtained through internet browsing, like bank accounts and so forth, can be deleted by the user or caused to be automatically deleted by the system 100.

Benefits of the system 100 include smart sensing, by enabling the control panel 135 in communication with the one or more sensor units 110, the local computing device 115, 120, and/or the remote computing device 140 to intelligently monitor, predict, and automatically and/or autonomously perform smart sensing related to an occupant of a smart home. Thereby improving the operating characteristics of the control panel 135 (e.g., managing CPU and memory usage levels, reducing latency, decreasing power consumption), because the control panel 135 by periodically receiving and/or pulling data from one or more devices (e.g., sensor units 110) and using predication models regulate other smart devices in the smart home with reduced processing requirements (e.g., CPU usage) for smart sensing occupant within the smart home.

Figure 2:
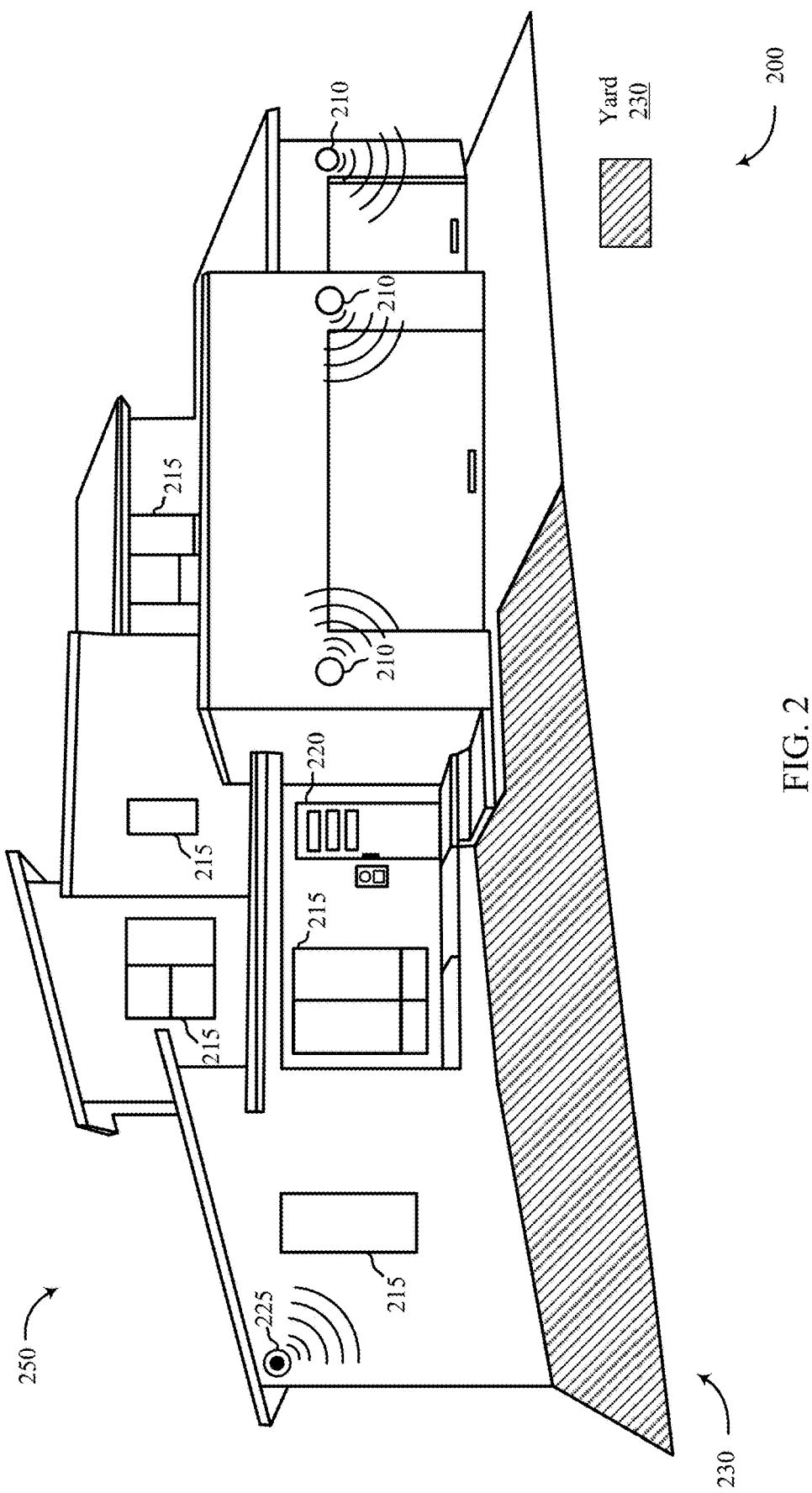
FIGS. 2 and 3 illustrate example diagrams relating to an example security and automation environment that supports smart sensing in accordance with aspects of the present disclosure.

FIG. 2 illustrates an example diagram relating to an example security and automation environment 200 that supports smart sensing in accordance with aspects of the present disclosure. In some examples, the security and automation environment 200 may implement aspects of the system 100. The security and automation environment 200 may include one or more sensor units 210 and one or more access points 215 and 220. For example, the access points 215 may include windows of a smart home 250, and the access points 220 may include an entrance door to the smart home 250. In some examples, an access point of the smart home 250 may include one or more garage doors. The one or more sensor units 210 may be installed, mounted, or integrated with one or more of the access points 215 and 220, or alternatively with an interior and/or an exterior surface of the smart home 250.

The control panel 135 may be located within the smart home 250. The control panel 135 may receive data from the one or more sensor units 210 that may be installed, mounted, or integrated with an exterior surface of the smart home 250. In some examples, the control panel 135 may communicate and receive data periodically or continuously from the sensor units 210. The control panel 135, the one or more sensor units 210, and a sensor unit 225 may communicate according to a radio access technology (RAT) such as 5G New Radio (NR) RAT, Long Term Evolution (LTE), Institute of Electrical and Electronics Engineers (IEEE) 802.11 (Wi-Fi), IEEE 802.16 (WiMAX), near-filed communication (NFC), ZigBee protocol, among others.

In some cases, as part of configuring the one or more sensor units 210 with the control panel 135, each sensor unit 210 may establish a connection with the control panel 135. For example, each sensor unit 210 may during initialization broadcast a beacon signal to the control panel 135. Additionally, the control panel 135 itself may broadcast a beacon signal to indicate its presence to the one or more sensor units 210. The beacon signal may include configuration information for the one or more sensor units 210 to configure and synchronize with the control panel 135. In some cases, the beacon signal broadcasted from each sensor unit 210 may include registration information. The registration information may include specification information and a unique identifier (e.g. serial number) identifying each sensor unit 210. The specification information may include warranty coverage information, repair and support information, vendor information, an energy consumption and cost report of operating a sensor unit 210, or any combination thereof.

In some cases, a sensor unit 225 may be a camera that monitors the status of the occupants of the smart home 250. For example, the sensor unit 225 may capture an image or a video of at least one occupant. In some examples, the sensor unit 225 may be a drone with a camera, or the sensor unit 225 may be a camera that may be mounted, installed, or configured to an exterior surface or interior surface of the smart home 250. In the case that the sensor unit 225 may be a drone with a camera or a standalone camera, the camera may be configured to capture aerial snapshots of the occupant when the occupant may be in the yard 230 or other area nearby the smart home 250. In some examples, the camera may be a wide-angle camera having a field-of-view which may cover a large portion or all of the space within a yard or interior room of the smart home 250. The camera may also have pan/tilt or zoom capabilities. In some examples, the camera may be a narrow-field-of-view camera compared to the wide-angle camera, to monitor a portion of the smart home 250).

Figure 3:
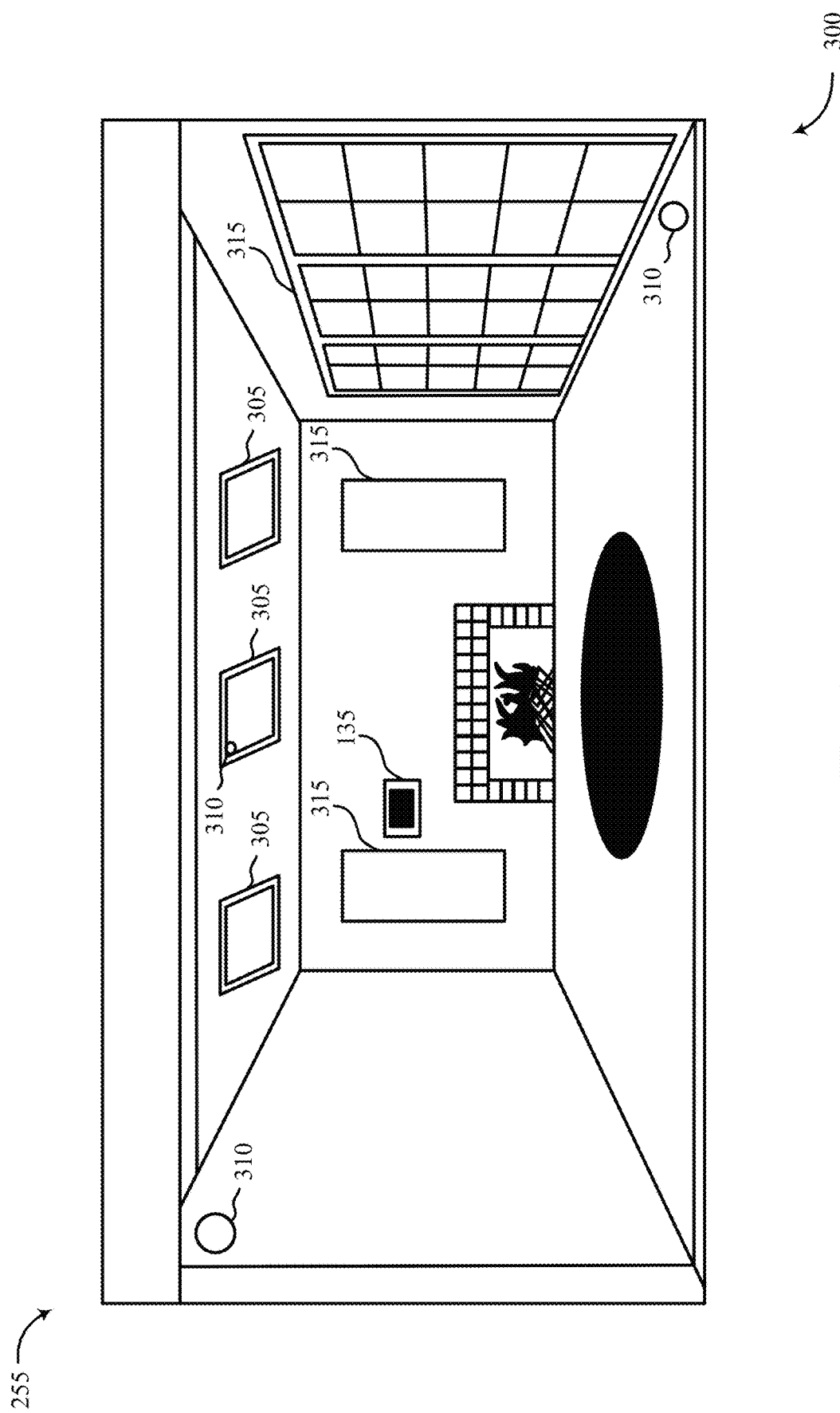

FIG. 3 illustrates an example diagram relating to an example security and automation environment 300 that supports smart sensing in accordance with aspects of the present disclosure. In some examples, the security and automation environment 300 may implement aspects of the system 100. In some examples, the security and automation environment 300 may implement aspects of the security and automation environment 200. The security and automation environment 300 may include one or more sensor units 310 and one or more access points 315. For example, the access points 315 may include windows or doors of a smart room 255. The one or more sensor units 310 may be installed, mounted, or integrated with one or more of the access points 315, or alternatively with an interior and/or an exterior surface (e.g., walls, floors) of the smart room 255.

The control panel 135 may be located within the smart room 255. The control panel 135 may receive data from the one or more sensor units 310 that may be installed and mounted with a surface of the smart room 255. The one or more sensor units 310 may be integrated with a home appliance or fixture such as a light bulb fixture. For example, one sensor unit may be installed and mounted on a wall, a second sensor unit may be installed or mounted on a floor. Additionally or alternatively, a third sensor unit may be installed or integrated with a light fixture 305. In some examples, the control panel 135 may communicate and receive data periodically or continuously from the sensor units 310. The control panel 135, the one or more sensor units 310 may communicate according to a RAT.

The one or more sensor units 310 may represent one or more separate sensors or a combination of two or more sensors in a single sensor device. For example, the one or more sensor units 310 may be an accelerometer sensor, an audio sensor, a motion sensor, a capacitance sensor, a camera, a temperature sensor, among others. The sensors may be used to monitor the movements and/or conversations of the occupants. The sensors may gather information that can be useful in determining the identity of the occupants, the interests of the occupants, the dislikes of the occupants, the products used by the occupants, the brands of the products used by the occupants, the hobbies of the occupants, the desires of the occupants, the challenges faced by the occupants, other types of information about the occupants, or combinations thereof.

For example, one sensor unit 310 may be a motion sensor that may detect movement of the occupants, another sensor unit 310 may be a camera that may capture images or a video within a field-of-view of where the detected movement may be occurring. Both sensor units 310 may transmit the sensor data (i.e., detected movement and captured image(s)) to the control panel 135. The control panel 135 may perform processing on the sensor data to determine or identify who or what is associated with the detected movement. For example, the control panel 135 may perform image recognition techniques or video analytics that may identify and confirm that an object in an area of the detected movement is one of the occupants, a pet of one of the occupants, a belonging of one of the occupants, or combinations thereof.

FIG. 4 illustrates an example diagram of information for identifying an occupant in accordance with aspects of the present disclosure. In some examples, the information may be stored in a database 400 that may be located at the smart home 250 or within the smart environment. The database 400 may include information that has been collected with sensors within the smart environment. The database 400 may include demographic information and information derived from the sensors. In the depicted example, demographic information stored in the database 400 includes age and gender, which are depicted in columns 410 and 415 respectively. Also, column 405 identifies the identity of the occupant. Column 420 includes information derived from video, and column 425 includes information derived from audio.

In row 430, the occupant may be identified as John Smith who is a male that is 42 years old. This demographic information may be obtained through sensors, but may be obtained from other sources. For example, the occupant may be requested to fill out at least some of the demographic information. In other examples, the demographic information may be obtained from public records associated with the occupant. In this example, the information derived from video may include that John Smith has a red truck parked in the driveway, John Smith searches Hawaii trips online, John has pictures of beaches in his bed room, and so forth. Also in this example, the information derived from audio includes that John loves his truck, will only go to Hawaii for less than $2,000, want to learn to surf, and believes that airlines tickets are horrible.

In row 435, the occupant may be identified as Mary Smith who is a female that is 39 years old. Her demographic information may be obtained in a similar manner or a different manner to how the demographic information contained in row 430 may be obtained. In this example, the information derived from video may include that Mary spends several minutes a day looking at the beach pictures, recently bought beach attire, and that she likes to ride bikes. In this example, the information derived from audio may include that she has wanted to go to Hawaii since she was a kid, that a Hawaii trip may be a top priority for her, she may be willing to pay any price to go to Hawaii, and that she already knows the Hawaiian resort where she wants to stay.

The information in the database 400 may be valuable to commercial entities that market trucks, airline tickets, hotels, vacation items, bicycling gear, Hawaii merchandise, or combinations thereof. A commercial entity may not just understand the types of products and services that interest John and Mary, but also know the price ranges, time frames, and other information that may affect John's and Mary's decision to purchase those products or services. As a result, the commercial entities may spend their resources sending ads to the Smith's that meet the parameters derived from the conversations and images within the Smith's home.

Figure 5:
FIG. 5 illustrates an example of a wireless device that supports smart sensing in accordance with aspects of the present disclosure

FIG. 5 illustrates an example of a wireless device 500 that supports smart sensing in accordance with aspects of the present disclosure. The wireless device 500 may be a smartphone 505. The wireless device 500 may also be the control panel 135, or the local computing devices 115 or 120, or the remote computing device 140 as described in FIG. 1. The smartphone 505 may include a user interface 510. The user interface 510 may be a touch screen that may display one or more graphics, and recognize a touch from an individual, stylus, or the like. The smartphone 505 may also include one or more physical buttons 512.

With reference to FIG. 1 and FIG. 5, the control panel 135 may transmit a notification message to the smartphone 505. The smartphone 505 may receive and display the notification message 515 via a dialogue window on a home screen of the user interface 510. The home screen may include a number of visual elements associated with the user interface 510. For example, a visual element may include a signal strength indicator for wireless communications, a time, and a battery status indicator. In some cases, the notification message may be preprogrammed with the control panel 135. That is, the control panel 135 may be preconfigured with a number of pre-generated messages that may be communicated or broadcasted (e.g., from the control panel 135).

In the depicted example, the notification message 515 may be in response to an occupant, such as Mary Smith, who is performing a task that is inconsistent with the occupant's unique characteristics. The occupant may have a unique characteristic of not leaving when she cooks. The message may indicate that Mary Smith has left the kitchen while the oven is on, which is not normal for her. The system 100 may request that someone check on Mary Smith.

In some cases, Mary may be an elderly women who lives with her husband. The system 100 may send the message to her husband who may be capable of checking on Mary to determine her condition (e.g., whether she is alright and whether the item she is cooking is alright as well). In some cases, her husband may be out of town or otherwise unavailable to assist his wife. In these types of situations, the system 100 may send the message to a neighbor, to a child that no longer lives in the home, to a care giver, to another type of person, or combinations thereof. In some cases, if the recipient of the message is unable to check on Mary, that recipient may be able to request that the message may be sent to another person. The original recipient may be able to check in later with the second recipient of the message when the original recipient becomes available. In some cases, if the second recipient fails to receive the message, the original recipient may be notified that the second recipient did not receive the message and request who else to send the message to. In some cases, the system 100 has a decision tree to whom to send the message based on availability, non-responsiveness, closeness of relationship with the occupant, proximity to the occupant, another factor, or combinations thereof. The decision tree may also be effected based on the type of message or the potential danger to the occupant.

In some cases, the recipient of the message may be able to view the occupant through a camera over the recipients mobile device or another type of device. For example, if the recipient receives the message, the recipient may be able to log into a mobile application or through a website to view the occupant. If the recipient determines that the occupant has returned to the kitchen or is otherwise safe, the recipient may decide that no further action is needed. In other examples, the recipient may determine that the occupant appears to have collapsed, looks ill, or is otherwise at risk. Based on the video images, the recipient may decide how to respond. In other cases, the recipient may be able to call the occupant through the occupant's mobile device, a speaker of the system 100, through another type of speaker, a networked speaker, another type of speaker, or combinations thereof.

In some cases, the system 100 may automatically call the recipient and provide an audio message indicating why the recipient is receiving the call. After a brief explanation, the system 100 may automatically connect the recipient to the occupant over the speaker so that the recipient is talking with the occupant. The system 100 may have a variety of mechanisms for communicating the situation to the recipient. In some cases, a predefined policy may outline different circumstances for which type of mechanism to use depending on a totality of factors that the system determines about the occupant's situation.

With the occupants being identified, the system 100 may customize responses for each occupant. Thus, the system 100 may treat each occupant differently depending on the activities that are unique to each occupant and the determined needs of each occupant. In some cases, each occupant may have a set of preferences for how the system 100 is to treat him or her. Thus, with the system 100 having an ability to distinguish between the different occupant identities, the system 100 may respond to each occupant differently.

In another example, a first occupant may a different pattern or a unique set of characteristic for when that occupant leaves the house. Based on identifying that the occupant is performing those unique characteristics, the system 100 may determine the type of activity that is about to occur, such as leaving the house, and the system 100 may also determine the identity of the occupant that is about to leave the house. In this circumstance, the identified occupant may have a preference that the system 100 turns out the lights when the occupant leaves the house, that the door is unlocked before the occupant arrives at the door, and that the thermostat changes its output when that occupant leaves the house. Thus, based on identifying the unique traits of the activity being performed by the occupant, the system may implement the occupant's unique preferences, even though the identified occupant may have different preferences than the other occupants in the household.

Figure 6:
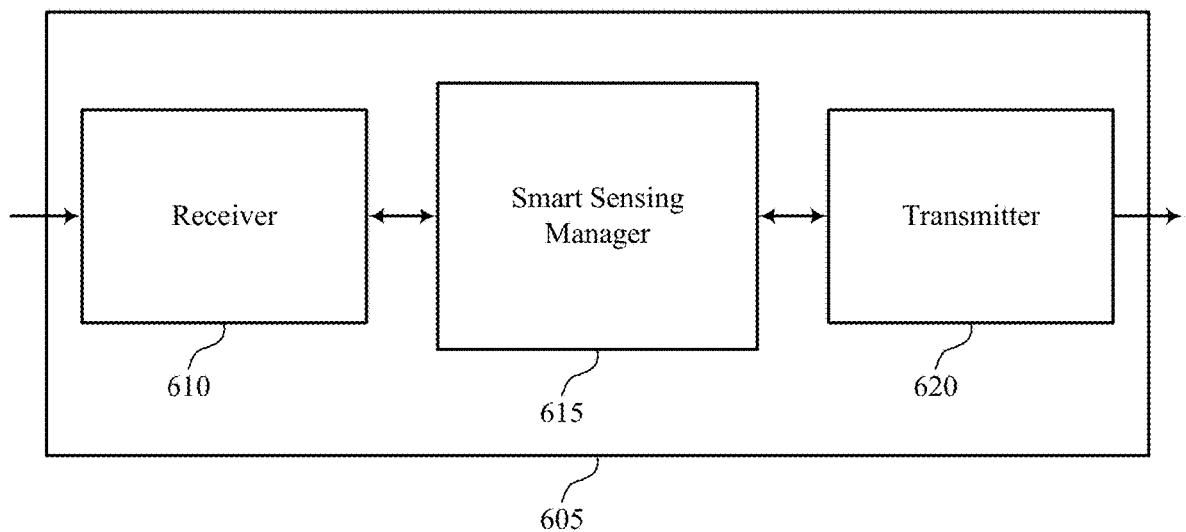
FIGS. 6 through 8 show block diagrams of a device that supports smart sensing in accordance with aspects of the present disclosure.

FIG. 6 shows a block diagram 600 of a device 605 that supports smart sensing in accordance with aspects of the present disclosure. Device 605 may be an example of aspects of a control panel 135, a local computing device 115, 120, a server 155, or remote computing device 140 as described herein. Device 605 may include receiver 610, smart sensing manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to smart sensing techniques, etc.). Information may be passed on to other components of the device. The receiver 610 may be an example of aspects of the transceiver 935 described with reference to FIG. 9. The receiver 610 may utilize a single antenna or a set of antennas.

Smart sensing manager 615 and/or at least some of its various sub-components may be implemented in hardware, software executed by a processor, firmware, or any combination thereof. If implemented in software executed by a processor, the functions of the smart sensing manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The smart sensing manager 615 and/or at least some of its various sub-components may be physically located at various positions, including being distributed such that portions of functions are implemented at different physical locations by one or more physical devices. In some examples, smart sensing manager 615 and/or at least some of its various sub-components may be a separate and distinct component in accordance with various aspects of the present disclosure. In other examples, smart sensing manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The smart sensing manager 615 may receive, from a sensor, sensor data associated with an event and one or more occupants at a structure, determine a characteristic of the event based at least in part on the received sensor data, determine a type of the event based at least in part on the characteristic, and identify an identity of an occupant based at least in part on the characteristic and the type of the event. The smart sensing manager 615 may receive sensor data related to the event from a second sensor different from the first sensor, and determine a second characteristic of the event based at least in part on the received sensor data from the second sensor.

The smart sensing manager 615 may construct a database from the received data and define an occupant-specific event based at least on part on associating the first characteristic and the second characteristic. In some examples, the constructed database may include an event type, associate the first characteristic with the event type, and associate the second characteristic with the event type.

The smart sensing manager 615 may compare a real-time event performed by the occupant to the first characteristic or the second characteristic, or both in the constructed database, and determine a match between the real-time event and the occupant-specific event based at least in part on the comparing.

The smart sensing manager 615 may detect the occupant performing a real-time event, compare a real-time event performed by the occupant to the first characteristic or the second characteristic, or both in the constructed database, and determine that the real-time event is different from the occupant-specific event based at least in part on the comparing. The smart sensing manager 615 may generate a message indicating that the real-time event performed by the occupant is different from the occupant-specific event, and transmit via transmitter 620 the message to another occupant associated with the structure or personnel located remote from the structure.

The smart sensing manager 615 may determine a level of influence on other occupant-specific events of other occupants associated with the structure based at least in part on occupant-specific events of the occupant, and perform a machine learning model on the other occupant-specific events to dynamically manage a characteristic profile of the other occupants based at least in part on the determined level of influence.

The smart sensing manager 615 may generate a message requesting the occupant to confirm the event, transmit via transmitter 620 the message to a device of the occupant, and receive via receiver 610 a response from the device of the occupant, and determine that the event is confirmed based at least in part on the received response. The smart sensing manager 615 may generate a message requesting the occupant to confirm the identity, transmit via transmitter 620 the message to a device of the occupant and receive via receiver 610 a response from the device of the occupant, and determine that the identity is confirmed based at least in part on the received response.

The smart sensing manager 615 may compare the characteristic of the event to at least one characteristic profile associated with the security or home automation system, determine whether the characteristic of the event matches at least one characteristic in the at least one characteristic profile, and determine that the characteristic of the event is unmatchable to at least one characteristic in the at least one characteristic profile based at least in part on the comparing. The smart sensing manager 615 may determine that the identity of the occupant is unknown based at least in part on the characteristic of the event being unmatchable to at least one characteristic in the at least one characteristic profile, generate a message indicating that the identity of the occupant is unknown, and transmit via transmitter 620 the message to a device associated with another occupant that is different from the occupant. The smart sensing manager 615 may perform machine learning classification via the security or home automation system to associate sensor data associated with an event and the one or more occupants.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
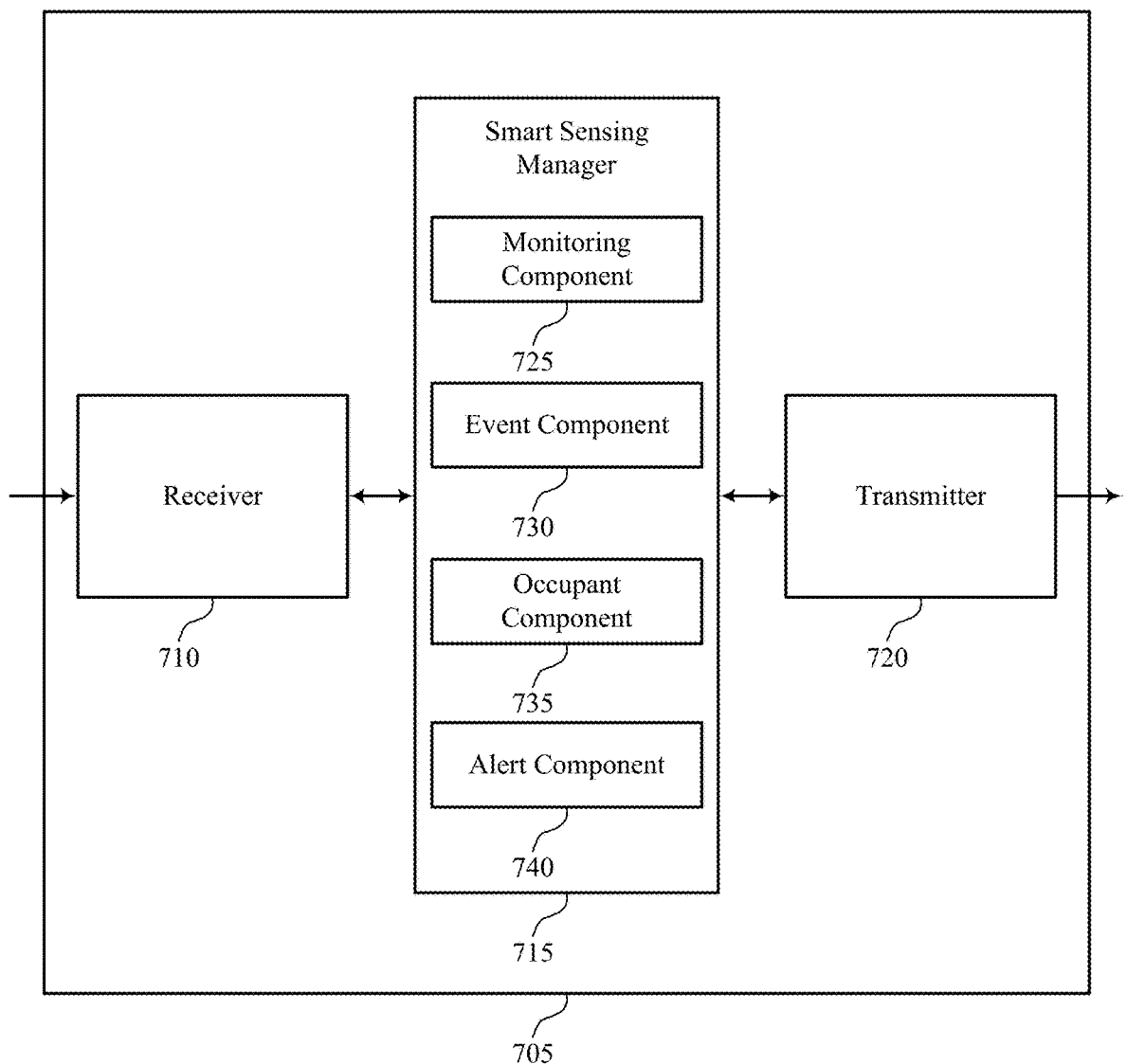

FIG. 7 shows a block diagram 700 of a device 705 that supports smart sensing accordance with aspects of the present disclosure. Device 705 may be an example of aspects of a device 605 or a control panel 135, a local computing device 115, 120, a server 155, or a remote computing device 140 as described with reference to FIGS. 1 and 6. Device 705 may include receiver 710, data manager 715, and transmitter 720. Device 705 may also include a processor. Each of these components may be in communication with one another (e.g., via one or more buses).

Receiver 710 may receive information such as packets, user data, or control information associated with various information channels (e.g., control channels, data channels, and information related to smart sensing techniques, etc.). Information may be passed on to other components of the device. The receiver 710 may be an example of aspects of the transceiver 935 described with reference to FIG. 9. The receiver 710 may utilize a single antenna or a set of antennas.

Smart sensing manager 715 may be an example of aspects of the smart sensing manager 615 described with reference to FIG. 6. The smart sensing manager 715 may also include monitoring component 725, event component 730, occupant component 735, and alert component 740.

The monitoring component 725 may monitor the occupants in the smart home. The monitoring component 725 may include sensors that collect various types of data about the occupants that can be stored locally or remotely.

The event component 730 may identify unique characteristics about an event. For example, the event component 730 may identify how long it takes to finish a task, a manner in how the event occurred, a patter associated with the event, other characteristics of the event, or a combination thereof. In some cases, the event component 730 may identify the event type based on the characteristics. For example, the event component 730 may identify the event as cooking when an occupant is in the kitchen, placing ingredients on the counter, turning on the stove, and performing other tasks that are associated with a cooking event. In some cases, the event component 730 may use a subset of the characteristics of the event to determine the event type and other characteristics to identify an identity of the occupant performing the event.

The occupant component 735 may determine an identity of the occupant based at least in part on one of the characteristics of the event. The characteristic used to identify the occupant may be a characteristic that is unique to just that occupant. The occupant component 735 may use unique characteristics to identify the occupants.

The alert component 740 may send an alert to a designated individual in response to determining that the identified occupant may be in need of assistance. The unique characteristics of how an occupant executes a task may be used as a baseline for how that occupant is to perform the task. If the occupant performs the task in a manner that is different than the baseline or different to the unique characteristics for that occupant. The alert component 740 may generate and send an alert to a designated individual. For example, if the unique characteristic for an elderly occupant is that her daily morning walk is less than an hour, and the occupant has not returned after an hour and ten minutes, the alert module may generate an alert. In some situations, the designated person may include the identified occupant that is perceived to need assistance. In a situation where the alert is sent to the identified occupant perceived to need assistance, the identified occupant may respond by indicating that he or she does not need assistance. In those situations where the identified occupant responds by indicating that he or she does need assistance or the occupant fails to respond, another alert may be sent to a different occupant or a caregiver that does not reside in the home. In some cases, the initial alert is sent to an individual other than the occupant that is perceived to need assistance.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
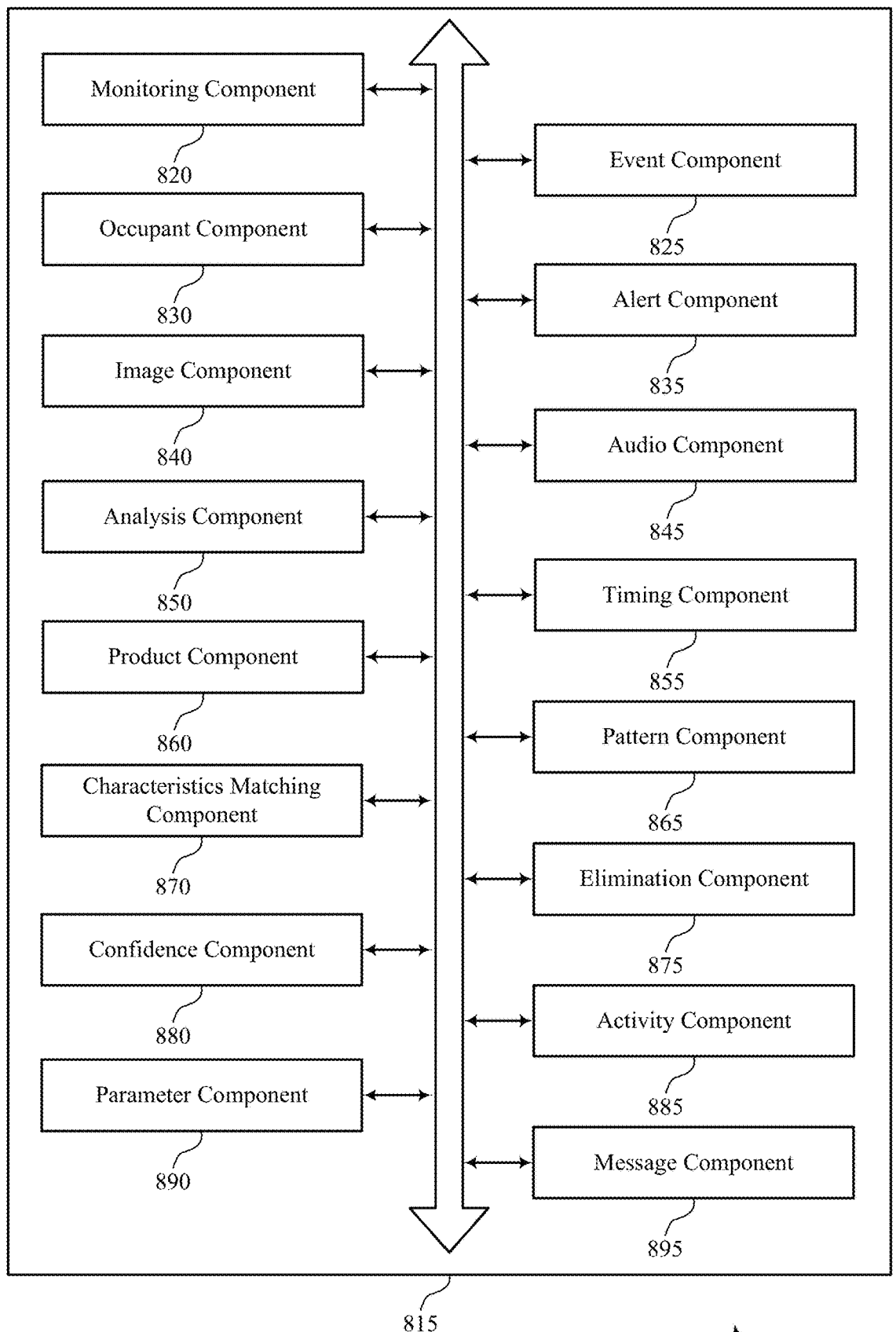

FIG. 8 shows a block diagram 800 of a smart sensing manager 815 that supports smart sensing in accordance with aspects of the present disclosure. The smart sensing manager 815 may be an example of aspects of a smart sensing manager 615, a smart sensing manager 715, or a smart sensing manager 915 described with reference to FIGS. 6, 7, and 9. The smart sensing manager 815 may include monitoring component 820, event component 825, occupant component 830, alert component 835, image component 840, audio component 845, analysis component 850, timing component 855, product component 860, pattern component 865, characteristic matching component 870, elimination component 875, confidence component 880, activity component 885, parameter component 890, and message component 895. Each of these components and/or modules may communicate, directly or indirectly, with one another (e.g., via one or more buses).

The monitoring component 820 may monitor the occupants in the smart home. The monitoring component 820 may include sensors that collect various types of data about the occupants that can be stored locally or remotely.

The event component 825 may identify unique characteristics about an event. For example, the event component 825 may identify how long it takes to finish a task, a manner in how the event occurred, a patter associated with the event, other characteristics of the event, or a combination thereof. In some cases, the event component 825 may identify the event type based on the characteristics. For example, the event component 825 may identify the event as cooking when an occupant is in the kitchen, placing ingredients on the counter, turning on the stove, and performing other tasks that are associated with a cooking event. In some cases, the event component 825 may use a subset of the characteristics of the event to determine the event type and other characteristics to identify an identity of the occupant performing the event.

The occupant component 830 may determine an identity of the occupant based at least in part on one of the characteristics of the event. The characteristic used to identify the occupant may be a characteristic that is unique to just that occupant. The occupant component 830 may use unique characteristics to identify the occupants.

The alert component 835 may send an alert to a designated individual in response to determining that the identified occupant may be in need of assistance. The unique characteristics of how an occupant executes a task may be used as a baseline for how that occupant is to perform the task. If the occupant performs the task in a manner that is different than the baseline or different to the unique characteristics for that occupant. The alert component 835 may generate and send an alert to a designated individual. For example, if the unique characteristic for an elderly occupant is that her daily morning walk is less than an hour, and the occupant has not returned after an hour and ten minutes, the alert module may generate an alert. In some situations, the designated person may include the identified occupant that is perceived to need assistance. In a situation where the alert is sent to the identified occupant perceived to need assistance, the identified occupant may respond by indicating that he or she does not need assistance. In those situations where the identified occupant responds by indicating that he or she does need assistance or the occupant fails to respond, another alert may be sent to a different occupant or a caregiver that does not reside in the home. In some cases, the initial alert is sent to an individual other than the occupant that is perceived to need assistance.

The image component 840 may control a camera that captures images of areas around and in the structure of a smart environment to determine how actions by occupants are performed. In some cases, the image component 840) may use facial recognition to determine the identity of the occupant and record the activities performed by the occupant. The image component 840 may rely on how the occupant performs activities to determine the identity of the occupant instead of using facial recognition. In some situations, facial recognition may be useful for identifying the occupant when the occupant is looking in the direction of a camera. However, in other situations facial recognition may not be as useful if the occupant is looking in a different direction. In those cases where facial recognition may not be available or where the occupant may not be facing a direction that allows facial recognition to work effectively, the image component 840 may use other types of mechanisms for identifying occupants. In some cases, the image component 840) may learn behavior, traits, idiosyncrasy, styles, patterns, and so forth of how the occupant executes a task, and the image component 840 can identify the identity of the occupant based at least in part on how the occupant carries out the task. In some instances, the image component 840) may determine how long it takes for that particular occupant to perform a task and how the occupant performs the task.

The audio component 845 may record sounds of the occupant while the occupant is performing a task. In some cases, an occupant specific characteristic may be that the occupant is silent while performing a particular task. In other examples, the occupant may continue to hold conversations while performing a specific task. In yet other examples, the occupant may recite certain phrases or song lyrics while performing a certain type of task. These inputs may be used to assist in determining how the occupant performs a task specific to the occupant.

The analysis component 850 may perform an analysis of the characteristics of performing a task or another type of activity that is unique to specific occupants. In some cases, more than one occupant in a household may have common characteristics. When these common characteristics are identified, the common characteristics may be useful in determining the type of task, event, or activity being performed by the occupant. In some cases, the common characteristics may not be useful for identifying the occupant that is performing the activity. In some cases, the common characteristics may be helpful in determining the identity of the occupant if some of the other occupants do not perform that type of activity or rarely perform that type of activity.

The timing component 855 may be used to record the time characteristic of an occupant. For example, the activity of getting ready for bed may include brushing teeth. One occupant may take longer brushing his or her teeth than another occupant. In some cases, a first occupant may take five minutes to brush his or her teeth, while a second occupant may take two minutes to brush his or her teeth. In this example, a common characteristic may be that brushing teeth takes longer than a minute and a half. As such, for those situations where the occupant is performing a task that takes less than a minute and half, the timing component 855 can rule out that the occupant is brushing his or her teeth.

In some examples, the time characteristic may be used to determine the event type. In some cases, when the occupant brushes his or her teeth for just 2.5 minutes, the timing component 855 may determine that the occupant is the second occupant. In some cases, the timing component 855 may take an average of time to execute a task, calculate the median time for an occupant to execute a task, or calculate another relationship of time. In some cases, when the occupant performs a task, a statistics algorithm may be applied to see how closely the real-time event takes based on the average, median, or other characteristic of time. For example, a statistical bell curve and standard deviations may be constructed and continuously updated by the timing component 855 to assist in determining whether the real-time event matches or is close enough with the occupant specific time characteristic. In other examples, the timing component 855 may determine a duration range that the occupant completes the task. In this example, when the occupant completes the task within the observed range, the system may determine the identity of the occupant. Conversely, in some cases, if the occupant completes the task outside of the range, the system may rule out certain occupants as the occupant performing the activity.

The product component 860 may identify types of products used by an occupant. For example, a first occupant may tend to snack on cookies while the other occupant snacks on hard candies. While the activity may both be snacking, the products used during snacking may constitute a products characteristic, which can be used to determine the identity of the occupant. In some cases, the brands of products may also be a characteristic that is unique enough to identify the identity of the occupant.

The pattern component 865 may identify pattern characteristics that are unique or common to the occupants. For example, a certain occupant may always tie his or her right shoe before tying the other shoe. In other examples, an occupant may always use his right hand to perform a certain activity. In yet another example, the occupant may always eat certain types of food before eating another certain type of food on his or her plate. These patterns may be unique to specific occupants.

The characteristics matching component 870 may match the real-time actions of an occupant that is being monitor against the characteristics stored in the database. In response to finding a match between a real-time characteristic and a stored characteristic that is unique to a specific occupant.

The elimination component 875 may determine that a specific occupant is not the actual occupant performing a certain activity in real-time because the characteristics of the real-time action do not match the occupant specific characteristics recorded in the database. In other cases, where the elimination component 875 rules out a specific occupant and there is only one other occupant, the elimination component 875 may determine that the other occupant is the identity of the occupant performing the activity. In other cases where multiple other occupants remain a possibility, the elimination component 875 may further narrow the field of options to determine the occupant based on one or more other factors.

The confidence component 880 may assign a confidence level to the unique characteristics. In some cases where the confidence level associated with a unique characteristic is high, the presence of the unique characteristic may be sufficient for the confidence component 880 to identify the identity of the occupant. In situations where the confidence level is low, more than the mere presence of the unique characteristic may be evaluated to determine the identity of the occupant. For example, at least two occupant unique characteristics may be needed before the confidence component 880 may determine the identity of the occupant. In another example, the low confidence characteristic may be present and the elimination of other occupants may assist the occupant identification module in determining the identity of the occupant.

The activity component 885 may monitor the activity of the occupant. In some cases, the activity component 885 may monitor the activity of the occupant for a time sufficient enough to determine the identity of the occupant. In this situation, the activity component 885 may continue to monitor the activity of the occupant. In some examples, the activity component 885 may include cameras, microphones, other types of sensors, or a combination thereof.

The parameter component 890 may determine whether the occupant continues to perform the activity conducive to the unique characteristics associated with the identity of the occupant in the databases. The characteristics associated with the occupant may define parameters for how long the occupant performs an activity, how the occupant performs the activity, or other characteristics for involving the occupant's activity. These characteristics may establish a baseline for how the occupant is expected to perform his or her activities. In some cases, after the occupant is identified, the occupant may perform a portion of his or her activity that is inconsistent with his or her baseline. For example, if the occupant has a baseline established for going for a morning walk that is under 45 minutes and the occupant has not returned home after 45 minutes, the parameter component 890 may identify that the occupant is outside his or her baseline.

In some cases, the continued monitoring and identification that the occupant is performing the activity outside of the baseline, may cause parameter component 890 to adjust the parameters of the occupant's activity. In these situations, the parameter component 890 may determine that the occupant is safely performing the activity and that the previously associated characteristics associated with the occupant may not have as accurately described how the occupant performs these activities. In some cases, as the sample size of observing the occupant performing activities grows, the characteristics of how the occupant performs his or her activities may be continuously adjusted.

In other examples, the parameter component 890 may identify that the occupant being outside of the occupant's baseline may be indicative of a dangerous situation. For example, if the occupant has not returned to his or her home after an hour or more for the expected baseline morning walk of under 45 minutes, the parameter component 890 may conclude that a message should be sent to the occupant, another occupant, a care giver, another type of person, or combinations thereof.

The message component 895 may receive an indication that the occupant is outside of his or her parameter and the type of activity is such that a message should be generated. In response, the message component 895 may send a message to the occupant, another occupant, a care giver, another type of person, or combinations thereof. The message component 895 may send the message initially to the occupant to confirm whether the occupant is safe or whether the parameters associated with the occupant in the database should be adjusted. The message component 895 may send another message to a different individual when the message component 895 receives a reply from the occupant indicating that a message to another individual would be helpful. In a situation where the message component 895 fails to receive a reply from the occupant, the message component 895 may send the message to a different individual requesting that the individual check on the occupant.

In examples where the message component 895 sends a message to an individual that is different than the occupant, the message component 895 may request a reply indicating that the individual received the message. The message component 895 may follow up with the individual to determine the outcome. If the occupant turned out to be safe, the message component 895 may cause the parameters associated with the occupant to be adjusted. In other examples, the message component 895 may confirm that the proper parameters were previously associated with the identity of the occupant. In some cases, if the message component 895 fails to receive a reply message from the individual, the message component 895 may send another message to a different individual until the message component 895 receives a confirmation that the message is received and/or confirmed the outcome of the situation. In some cases, if none of the individuals are responding and the alert module deems it appropriate, public emergency personnel may be contacted.

Figure 9:
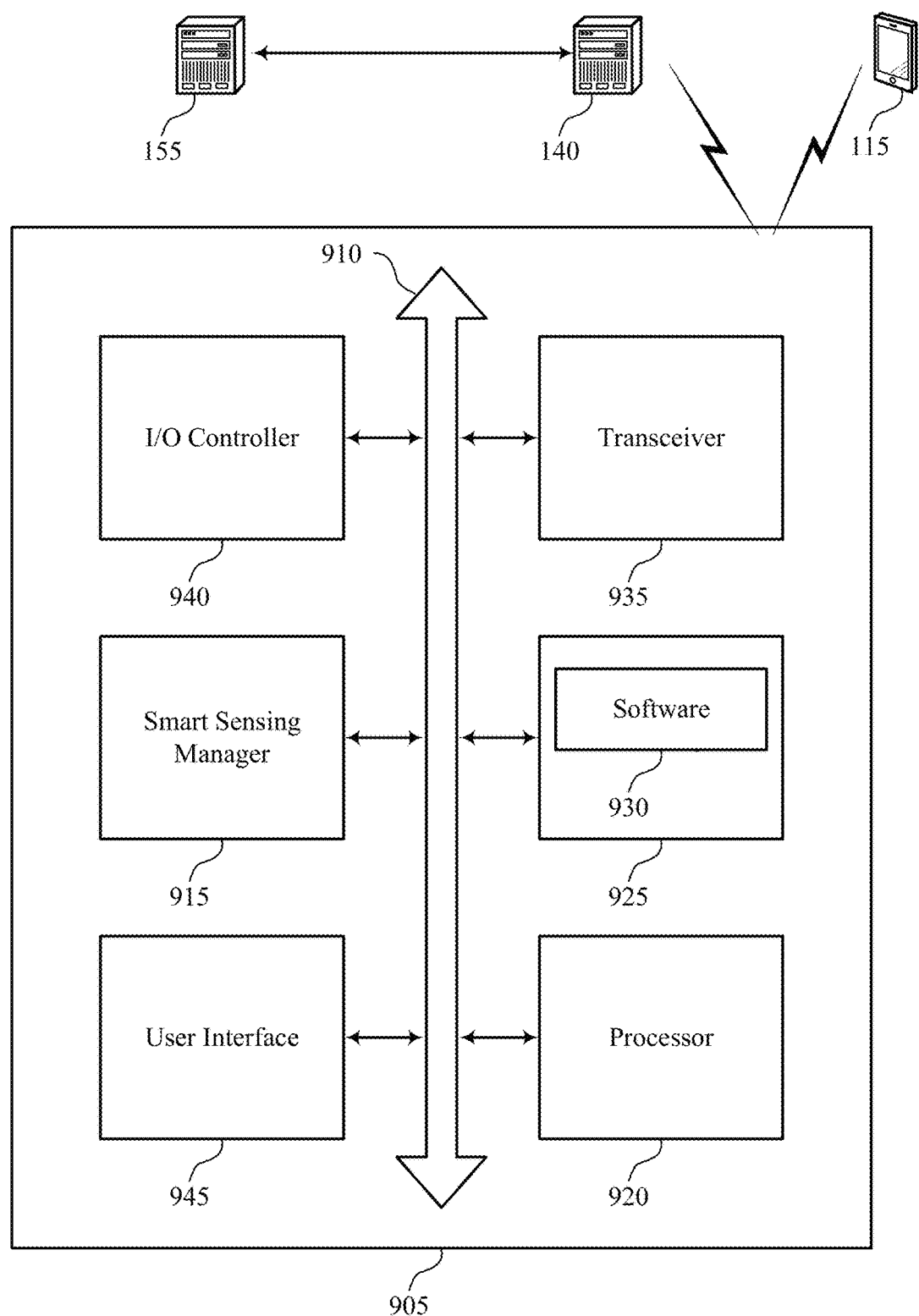
FIG. 9 illustrates a block diagram of a system including a device that supports smart sensing in accordance with aspects of the present disclosure.

FIG. 9 shows a diagram of a system 9 including a device 905 that supports smart sensing in accordance with aspects of the present disclosure. Device 905 may be an example of or include the components of device 605, device 705, or a control panel 135, a local computing device 115, 120, a server 155, or a remote computing device 140 as described above, e.g., with reference to FIGS. 1, 6, and 7. Device 905 may include components for bi-directional voice and data communications including components for transmitting and receiving communications, including smart sensing manager 915, processor 920, memory 925, software 930, transceiver 935, I/O controller 940, and user interface 945. These components may be in electronic communication via one or more buses (e.g., bus 910).

In some cases, device 905 may communicate with a remote computing device 140, and/or a remote server (e.g., server 155). For example, one or more elements of device 905 may provide a direct connection to the server 155 via a direct network link to the Internet via a POP (point of presence). In some cases, one element of device 905 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of system 900 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some cases, all of the elements shown in FIG. 9 need not be present to practice the present systems and methods. The devices and subsystems may also be interconnected in different ways from that shown in FIG. 9. In some cases, an aspect of the operations of system 900 may be readily known in the art and are not discussed in detail in this disclosure.

The signals associated with system 900 may include wireless communication signals such as radio frequency, electromagnetics, local area network (LAN), wide area network (WAN), virtual private network (VPN), wireless network (using 802.11, for example), 345 MHZ, Z-WAVER, cellular network (using 3G and/or Long Term Evolution (LTE), for example), and/or other signals. The radio access technology (RAT) of system 900 may be related to, but are not limited to, WWAN (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of system 900 via a network using the one or more wired and/or wireless connections.

The smart sensing manager 915 may receive, from a sensor, sensor data associated with an event and one or more occupants at a structure, determine a characteristic of the event based at least in part on the received sensor data, determine a type of the event based at least in part on the characteristic, and identify an identity of an occupant based at least in part on the characteristic and the type of the event.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting smart sensing techniques and managing privacy of data).

Memory 925 may include random access memory (RAM) and read only memory (ROM). The memory 925 may store computer-readable, computer-executable software 1630 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support smart sensing techniques. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

User interface 945 may enable a user to interact with device 905. In some cases, the user interface 945 may include an audio device, such as an external speaker system, an external display device such as a display screen, or an input device (e.g., remote control device interfaced with the user interface 945 directly or through the I/O controller module).

Figure 10:
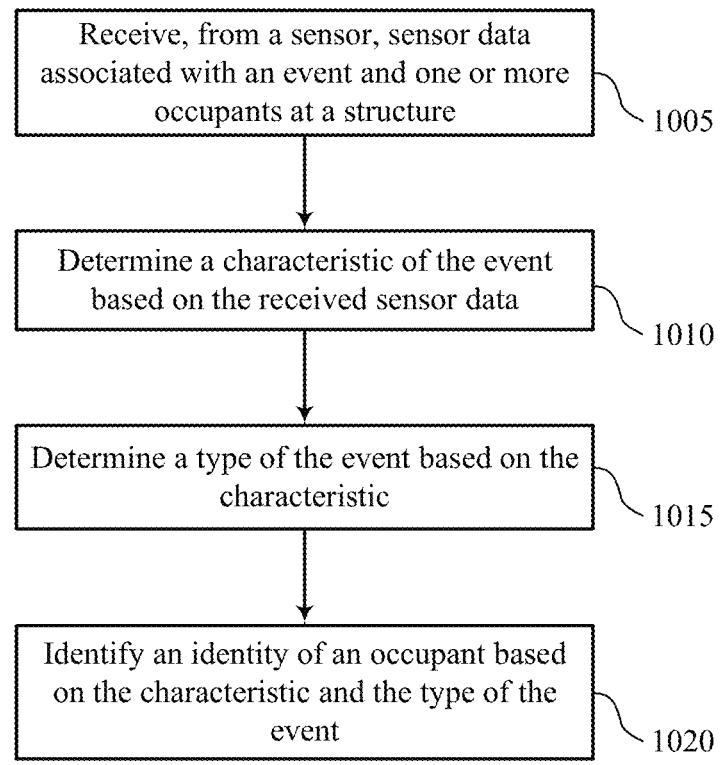
FIGS. 10 and 11 illustrate methods for smart sensing in accordance with aspects of the present disclosure.

FIG. 10 shows a flowchart illustrating a method 1000 for smart sensing in accordance with aspects of the present disclosure. The operations of method 1000 may be implemented by a control panel 135 or its components as described herein. For example, the operations of method 1000 may be performed by a smart sensing manager as described with reference to FIGS. 6 through 9. In some cases, additionally or alternatively, the operations of method 1000 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 1005, the control panel 135 may receive, from a sensor, sensor data associated with an event and one or more occupants at a structure. For example, the sensor may monitor information about how the one or more occupants perform an activity making up the event. The data may be collected through at least one sensor associated with the control panel 135. In some examples, the data may be collected through at least one sensor. The sensor may be a camera, a microphone, a proximity sensor, a motion sensor, a temperature sensor, a touch sensor, other types of sensors, or a combination thereof. The operations of 1005 may be performed according to the methods described herein. In certain examples, aspects of the operations of 1005 may be performed by at least one of the components as described with reference to FIGS. 6 through 9.

At 1010, the control panel 135 may determine a characteristic of the event based on the received sensor data. The characteristics may include a location of where an occupant performs an activity, how the occupant performs the activity, a duration associated with how long the occupant performs the activity, the products the occupant performs the activity with, the brands of the products used by the occupant, patterns of the occupant performed by the occupant during the event, other characteristics related to the event performed by the occupant, or a combination thereof. The operations of 1010 may be performed according to the methods described herein. In certain examples, aspects of the operations of 1010 may be performed by at least one of the components as described with reference to FIGS. 6 through 9.

At 1015, the control panel 135 may determine a type of the event based on the received sensor data. In some examples, one or more characteristics of the occupant performing an activity during the event may be common among each of the occupants. These common characteristics may be distinguishable between different types of activities. The operations of 1015 may be performed according to the methods described herein. In certain examples, aspects of the operations of 1015 may be performed by at least one of the components as described with reference to FIGS. 6 through 9.

At 1020, the control panel 135 may identify an identity of an occupant based on the characteristics and the type of the event. In some examples, the characteristics that may be unique to a specific occupant may be associated with the occupant in a database. As a result, when the sensors receive data indicating that the unique characteristics of the specific occupant are being detected, the control panel 135 may determine that the specific occupant is performing the activity. The operations of 1020 may be performed according to the methods described herein. In certain examples, aspects of the operations of 1020 may be performed by at least one of the components as described with reference to FIGS. 6 through 9.

Figure 11:
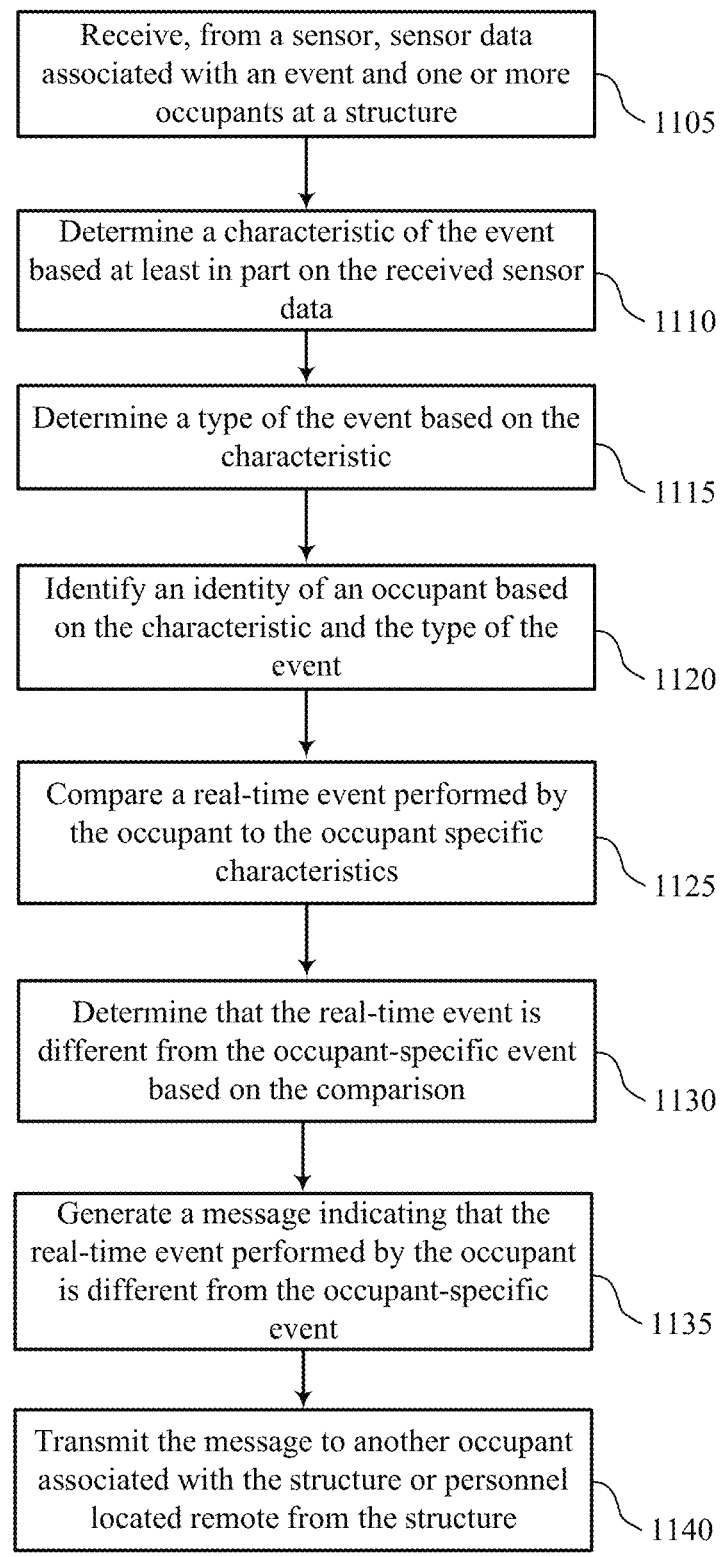

FIG. 11 shows a flowchart illustrating a method 1100 for smart sensing in accordance with aspects of the present disclosure. The operations of method 1100 may be implemented by a control panel 135 or its components as described herein. For example, the operations of method 1100 may be performed by a smart sensing manager as described with reference to FIGS. 6 through 9. In some cases, additionally or alternatively, the operations of method 1100 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 1105, the control panel 135 may receive, from a sensor, sensor data associated with an event and one or more occupants at a structure. For example, the sensor may monitor information about how the one or more occupants perform an activity making up the event. The data may be collected through at least one sensor associated with the control panel 135. In some examples, the data may be collected through at least one sensor. The sensor may be a camera, a microphone, a proximity sensor, a motion sensor, a temperature sensor, a touch sensor, other types of sensors, or a combination thereof. The operations of 1105 may be performed according to the methods described herein. In certain examples, aspects of the operations of 1105 may be performed by at least one of the components as described with reference to FIGS. 6 through 9.

At 1110, the control panel 135 may determine a characteristic of the event based on the received sensor data. The characteristics may include a location of where an occupant performs an activity, how the occupant performs the activity, a duration associated with how long the occupant performs the activity, the products the occupant performs the activity with, the brands of the products used by the occupant, patterns of the occupant performed by the occupant during the event, other characteristics related to the event performed by the occupant, or a combination thereof. The operations of 1110 may be performed according to the methods described herein. In certain examples, aspects of the operations of 1110 may be performed by at least one of the components as described with reference to FIGS. 6 through 9.

At 1115, the control panel 135 may determine a type of the event based on the received sensor data. In some examples, one or more characteristics of the occupant performing an activity during the event may be common among each of the occupants. These common characteristics may be distinguishable between different types of activities. The operations of 1115 may be performed according to the methods described herein. In certain examples, aspects of the operations of 1115 may be performed by at least one of the components as described with reference to FIGS. 6 through 9.

At 1120, the control panel 135 may identify an identity of an occupant based on the characteristics and the type of the event. In some examples, the characteristics that may be unique to a specific occupant may be associated with the occupant in a database. As a result, when the sensors receive data indicating that the unique characteristics of the specific occupant are being detected, the control panel 135 may determine that the specific occupant is performing the activity. The operations of 1120 may be performed according to the methods described herein. In certain examples, aspects of the operations of 1120 may be performed by at least one of the components as described with reference to FIGS. 6 through 9.

At 1125, the control panel 135 may compare a real-time event performed by the occupant to the occupant specific characteristics. In some examples, the real-time event may be compared to the unique characteristics in the database, for example, after the control panel 135 initially identifies the identity of the occupant. The operations of 1125 may be performed according to the methods described herein. In certain examples, aspects of the operations of 1125 may be performed by at least one of the components as described with reference to FIGS. 6 through 9.

At 1130, the control panel 135 may determine that the real-time event is different from the occupant-specific event based on the comparison. In some examples, the real-time event may exhibit characteristics that are different than the occupant specific characteristics. For example, after the occupant is identified based on the occupant specific characteristics, at least one of the characteristics of the identified occupant, such as how long it take the identified occupant to perform a task, may be different than what is associated with the identified occupant in the database. The operations of 1130 may be performed according to the methods described herein. In certain examples, aspects of the operations of 1130 may be performed by at least one of the components as described with reference to FIGS. 6 through 9.

At 1135, the control panel 135 may generate a message indicating that the real-time event performed by the occupant is different from the occupant-specific event. The message may include a request to check on the identified occupant to ensure that the identified occupant is safe or to request that the identified occupant be given assistance. The operations of 1135 may be performed according to the methods described herein. In certain examples, aspects of the operations of 1135 may be performed by at least one of the components as described with reference to FIGS. 6 through 9.

At 1140, the control panel 135 may transmit the message to another occupant associated with the structure or personnel located remote from the structure. In some examples, the other occupant may be a family member or another occupant that resides in the residence with the identified occupant. In some cases, the control panel 135 may send the message to any occupant that is not the identified occupant. In some cases, the identified occupant may have a preference that a certain other occupant is the recipient when the message is about the identified occupant. In these situations, the control panel 135 may comply with the identified occupant's preference by sending the message to the predetermined individual. In some cases, the identified occupant may not have a preference for which other person is to be the recipient of the identified occupant's messages. In such an example, the control panel 135 may have a default individual to receive messages, or the control panel 135 may base the selection of the recipient on another appropriate factor. In some cases, the recipient of the message may not reside in the structure. For example, a doctor, an adult child, a remote care giver, a neighbor, emergency personnel, or another type of person may be the recipient of the message. The operations of 1140 may be performed according to the methods described herein. In certain examples, aspects of the operations of 1140 may be performed by at least one of the components as described with reference to FIGS. 6 through 9.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone: B alone: C alone: A and B in combination: A and C in combination: B and C in combination: or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A method for smart sensing using a security or home automation system, comprising:
   receiving, from a sensor by a sensing smart manager, sensor data associated with an event and an occupant at a structure, the event comprising a task that the occupant performs in relation to the structure;
   determining, by the sensing smart manager, a first characteristic associated with the occupant during performance of the event based at least in part on the received sensor data, the first characteristic indicating how the occupant performs the event;
   determining, by an event component, a type of the event based at least in part on the first characteristic;
   identifying, by an occupant component, an identity of an occupant based at least in part on the first characteristic and the type of the event obtained by the event component, wherein a combination of the first characteristic of the event, and the type of the event indicates the identity of the occupant;
   analyzing, by the sensing smart manager, based at least in part on the identity obtained from the occupant component, a comparison with a stored baseline for how the identified occupant performs the event, the baseline corresponding to the identity and comprising at least one of: a length of time taken for the identified occupant to perform the event, a pattern of the identified occupant's performance of the event, or a combination thereof; and in response to determining that the identified occupant performs the event differently from the baseline of the identified occupant, based at least in part on the first characteristic, generating a notification, by the smart sensing manager, and transmitting, via a transmitter, a notification to a designated individual.

2. The method of claim 1, further comprising:

receiving, by the sensing smart manager, sensor data related to the event from a second sensor different from the first sensor; and determining, by the sensing smart manager, a second characteristic of the event based at least in part on the received sensor data from the second sensor, wherein identifying the identity of the occupant is further based at least in part on the characteristic, the second characteristic, and the type of the event.

3. The method of claim 2, further comprising:

constructing a database from the received data comprising:
an event type;
associating the first characteristic with the event type; and
associating the second characteristic with the event type; and defining an occupant-specific event based at least in part on associating the first characteristic and the second characteristic and the occupant identity.

4. The method of claim 3, further comprising:

comparing a real-time event performed by the occupant to the first characteristic or the second characteristic, or both in the constructed database; and determining a match between the real-time event and the occupant-specific event based at least in part on the comparing, wherein identifying the identity of the occupant is further based at least in part on the determined match.

5. The method of claim 3, further comprising:

detecting the occupant performing a real-time event;

comparing a real-time event performed by the occupant to the first characteristic or the second characteristic, or both in the constructed database, wherein identifying the identity the occupant is further based at least in part on the first characteristic or the second characteristic, or both; and determining that the real-time event is different from the occupant-specific event based at least in part on the comparing.

6. The method of claim 5, further comprising:

generating a message indicating that the real-time event performed by the occupant is different from the occupant-specific event; and transmitting the message to another occupant associated with the structure or personnel located remote from the structure.

7. The method of claim 1, further comprising:

determining a level of influence on other occupant-specific events of other occupants associated with the structure based at least in part on occupant-specific events of the occupant; and performing a machine learning model on the other occupant-specific events to dynamically manage a characteristic profile of the other occupants based at least in part on the determined level of influence.

8. The method of claim 1, further comprising:

generating a message requesting the occupant to confirm the event;
transmitting the message to a device of the occupant;
receiving a response from the device of the occupant; and
determining that the event is confirmed based at least in part on the received response.

9. The method of claim 1, further comprising:

generating a message requesting the occupant to confirm the identity;
transmitting the message to a device of the occupant;
receiving a response from the device of the occupant; and
determining that the identity is confirmed based at least in part on the received response.

10. The method of claim 1, further comprising:

comparing the characteristic of the event to at least one characteristic profile associated with the security or home automation system;
determining whether the characteristic of the event matches at least one characteristic in the at least one characteristic profile; and
determining that the characteristic of the event is unmatchable to at least one characteristic in the at least one characteristic profile based at least in part on the comparing.

11. The method of claim 10, further comprising:

determining that the identity of the occupant is unknown based at least in part on the characteristic of the event being unmatchable to at least one characteristic in the at least one characteristic profile;
generating a message indicating that the identity of the occupant is unknown; and
transmitting the message to a device associated with another occupant that is different from the occupant.

12. The method of claim 1, further comprising:

performing machine learning classification via the security or home automation system to associate sensor data associated with an event and the occupant, wherein identifying the identity of the occupant is further based at least in part on the machine learning classification.

13. An apparatus configured for smart sensing using a security or home automation system, comprising:

a processor;
memory in electronic communication with the processor; and
instructions stored in the memory, the instructions being executable by the processor to:
receive, from a sensor by a sensing smart manager, sensor data associated with an event and an occupant at a structure, the event comprising a task that the occupant performs in relation to the structure;
determine, by the sensing smart manager, a first characteristic associated with the occupant during performance of the event based at least in part on the received sensor data, the first characteristic indicating how the occupant performs the event;
determine, by an event component, a type of the event based at least in part on the first characteristic;
identify, by an occupant component, an identity of an occupant based at least in part on the first characteristic and the type of the event obtained by the event component, wherein a combination of the first characteristic of the event and the type of the event indicates the identity of the occupant;

analyze, by the sensing smart manager, based at least in part on the identity obtained from the occupant component, a comparison with a stored baseline for how the identified occupant performs the event, the baseline corresponding to the identity and comprising at least one of: a length of time taken for the identified occupant to perform the event, a pattern of the identified occupant's performance of the event, or a combination thereof; and in response to determining that the identified occupant performs the event differently from the baseline, based at least in part on the first characteristic, generate a notification, by the smart sensing manager, and transmit a notification to a designated individual.

14. The apparatus of claim 13, wherein the instructions are executable by the processor to:

receive, by the sensing smart manager, sensor data related to the event from a second sensor different from the first sensor; and determine, by the sensing smart manager, a second characteristic of the event based at least in part on the received sensor data from the second sensor, wherein identifying the identity of the occupant is further based at least in part on the characteristic, the second characteristic, and the type of the event.

15. The apparatus of claim 14, wherein the instructions are executable by the processor to:

construct a database from the received data comprising:
an event type;
associate the first characteristic with the event type;
associate the second characteristic with the event type; and
define an occupant-specific event based at least in part on associating the first characteristic and the second characteristic and the occupant identity.

16. The apparatus of claim 15, wherein the instructions are executable by the processor to:

compare a real-time event performed by the occupant to the first characteristic or the second characteristic, or both in the constructed database; and determine a match between the real-time event and the occupant-specific event based at least in part on the comparison, wherein identifying the identity of the occupant is further based at least in part on the determined match.

17. The apparatus of claim 15, wherein the instructions are executable by the processor to:

detect the occupant performing a real-time event;
compare a real-time event performed by the occupant to the first characteristic or the second characteristic, or both in the constructed database, wherein identifying the identity the occupant is further based at least in part on the first characteristic or the second characteristic, or both; and determine that the real-time event is different from the occupant-specific event based at least in part on the comparing.

18. The apparatus of claim 13, wherein the instructions are executable by the processor to:

generate a message requesting the occupant to confirm the identity;
transmit the message to a device of the occupant;
receive a response from the device of the occupant; and
determine that the identity is confirmed based at least in part on the received response.

19. The apparatus of claim 13, wherein the instructions are further executable by the processor to:

perform machine learning classification via the security or home automation system to associate sensor data associated with an event and the occupant, wherein identifying the identity of the occupant is further based at least in part on the machine learning classification.

20. A non-transitory computer-readable medium for smart sensing, by a processor, using a security or home automation system, the non-transitory computer-readable medium storing instructions operable to cause a processor to:

receive, from a sensor by a sensing smart manager, sensor data associated with an event and an occupant at a structure, the event comprising a task that the occupant performs in relation to the structure;

determine, by the sensing smart manager, a first characteristic associated with the occupant during performance of the event based at least in part on the received sensor data, the first characteristic indicating how the occupant performs the event;

determine, by an event component, a type of the event based at least in part on the first characteristic;

identify, by an occupant component, an identity of an occupant based at least in part on the first characteristic and the type of the event obtained by the event component, wherein the first characteristic of the event, and the type of the event indicates the identity of the occupant;

analyze, by the sensing smart manager, base at least in part on the identity obtained from the occupant component, a comparison with a stored baseline for how the occupant performs the event, the baseline corresponding to the identity and comprising at least one of: a length of time taken for the occupant to perform the event, a pattern of the occupant's performance of the event, or a combination thereof; and in response to determining that the occupant performs the event differently from the baseline, based at least in part on the first characteristic, generate a notification, by the smart sensing manager, and transmit, via a transmitter, a notification to a designated individual.

* * * * *